(12) United States Patent
Leem et al.

(10) Patent No.: US 10,949,949 B2
(45) Date of Patent: Mar. 16, 2021

(54) NON-TRANSITORY COMPUTER-READABLE MEDIUM AND METHOD FOR MONITORING A SEMICONDUCTOR FABRICATION PROCESS

(71) Applicant: SAMSUNG ELECTRONICS CO., LTD., Suwon-si (KR)

(72) Inventors: Choonshik Leem, Seoul (KR); Taelim Choi, Seoul (KR); Yongdeok Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 16/402,375

(22) Filed: May 3, 2019

(65) Prior Publication Data

US 2020/0090304 A1    Mar. 19, 2020

(30) Foreign Application Priority Data

Sep. 13, 2018  (KR) ......................... 10-2018-0109500

(51) Int. Cl.
*G06T 3/40* (2006.01)
*G06T 7/00* (2017.01)

(52) U.S. Cl.
CPC .......... *G06T 3/4046* (2013.01); *G06T 3/4053* (2013.01); *G06T 7/0004* (2013.01);
(Continued)

(58) Field of Classification Search
CPC .......... G06K 9/00771; G06K 9/00288; G06K 9/00335; G06K 9/00369; G06K 9/78;
(Continued)

(56) References Cited

U.S. PATENT DOCUMENTS 9,478,393 B2    10/2016  Potocek et al.
10,467,729 B1 *  11/2019  Perera ................... G06T 3/4053
(Continued)

FOREIGN PATENT DOCUMENTS

CN    107680044    2/2018
CN    108009989    5/2018
(Continued)

OTHER PUBLICATIONS

Jin Yamanaka et al., "Fast and Accurate Image Super Resolution by Deep CNN with Skip Connection and Network in Network", Proceedings of SPIE—the international society for optical engineering—Feb. 2017, pp. 1-9.
(Continued)

*Primary Examiner* — Amandeep Saini
(74) *Attorney, Agent, or Firm* — F. Chau & Associates, LLC

(57) ABSTRACT

A non-transitory computer-readable medium for monitoring a semiconductor fabrication process includes an image conversion model having an artificial neural network. The image conversion model, when executed, causes the processor to receive a first image and a second image of a semiconductor wafer. The artificial neural network is trained by inputting a dataset representing the first image and the second image, generating a conversion image of the semiconductor wafer and calibrating weights and biases of the artificial neural network to match the conversion image to the second image. A third image of the semiconductor wafer is generated based on the calibrated weights and biases of the artificial neural network. The image conversion model with the trained artificial neural network may be transmitted to another device for image conversion of low resolution images.

20 Claims, 11 Drawing Sheets

(52) U.S. Cl.
CPC ............. *G06T 2207/10061* (2013.01); *G06T 2207/20081* (2013.01); *G06T 2207/20084* (2013.01); *G06T 2207/30148* (2013.01)

(58) Field of Classification Search
CPC ........... G06F 3/14; G08B 21/24; G10L 15/22; G10L 17/005; H04N 7/18; H04N 21/4223; H04N 21/44218; H04N 21/4316; H04N 21/814; G06T 2207/30196; G06T 2207/30232; G06T 7/70; G06T 7/50; G06T 7/20
USPC ........................................................ 382/103
See application file for complete search history.

(56) References Cited

U.S. PATENT DOCUMENTS

| | | | |
|---|---|---|---|
| 2004/0165761 A1* | 8/2004 | Hung | ................ G06T 7/001 382/141 |
| 2015/0002651 A1 | 1/2015 | Shimizu et al. | |
| 2015/0213599 A1* | 7/2015 | Buzaglo | ............ G06K 9/4628 382/128 |
| 2015/0294219 A1 | 10/2015 | Krizhevsky | |
| 2016/0117587 A1 | 4/2016 | Yan et al. | |
| 2016/0268098 A1 | 9/2016 | Choi et al. | |
| 2017/0046588 A1 | 2/2017 | Cho | |

FOREIGN PATENT DOCUMENTS

| | | | |
|---|---|---|---|
| EP | 2 927 748 | 10/2015 | |
| JP | 2009-250681 | 10/2009 | |
| KR | 10-1437154 | 9/2014 | |
| KR | 10-1456794 | 11/2014 | |
| KR | 10-1677822 | 11/2016 | |
| KR | 10-2017-0019949 | 2/2017 | |
| KR | 10-2017-0077183 | 7/2017 | |
| WO | WO-2019043525 A1 * | 3/2019 | ........... H04N 7/0125 |

OTHER PUBLICATIONS

Kensuke Umehara et al., "Super-resolution convolutional neural network for the improvement of the image quality of magnified images in chest radiographs", International conference on neural information processing, pp. 217-225.

* cited by examiner

NON-TRANSITORY COMPUTER-READABLE MEDIUM AND METHOD FOR MONITORING A SEMICONDUCTOR FABRICATION PROCESS

CROSS-REFERENCE TO RELATED APPLICATIONS

This application claims priority under 35 U.S.C. § 119 to Korean Patent Application No. 10-2018-0109500, filed on Sep. 13, 2018 in the Korean Intellectual Property Office, the disclosure of which is incorporated by reference herein in its entirety.

1. Technical Field

Embodiments of the inventive concept described herein relate to a non-transitory computer-readable medium including an image conversion model having an artificial neural network and a method of converting an image of a semiconductor wafer, for monitoring a semiconductor fabrication process.

2. Discussion of Related Art

Developments in miniaturizing the process of manufacturing a semiconductor device have resulted in the shrinking of a design rule and a decrease in a critical dimension (CD). Therefore, it is necessary to accurately monitor a fabrication process of a semiconductor device.

An electron microscope such as a critical dimension scanning electron microscope (CD-SEM) may be used to monitor the fabrication process of a semiconductor device. For monitoring shrinking materials and dimensions, the size of an electron beam output from the electron microscope has to be reduced, along with improved electronic detectors. To obtain a high-resolution image from the electron microscope, more time and processing resources are needed. For example, scanning a field of view (FOV) area with more frames, and more iterations of processing are required to improve signal to noise ratio (SNR). In this case, a time necessary to obtain the high-resolution image may increase. The increase in the time necessary to obtain the high-resolution image from the electron microscope may cause an increase in a time necessary to fabricate a semiconductor device or an increase in the number of electron microscopes used to improve the above-described time. In any case, an increase in a time and costs necessary to monitor a semiconductor fabrication process is inevitable.

SUMMARY

Embodiments of the inventive concept provide a non-transitory computer-readable medium including an image conversion model which includes an artificial neural network and a method of converting an image of a semiconductor wafer for monitoring a semiconductor fabrication process.

According to an exemplary embodiment, a non-transitory computer-readable medium for monitoring a semiconductor fabrication process includes an image conversion model stored on the non-transitory computer-readable medium. The image conversion model includes an artificial neural network. The image conversion model includes instructions executable by at least one processor, the instructions when executed by the at least one processor, causes the processor to receive a first image and a second image of a semiconductor wafer, the first image and the second image being generated by a measuring device, wherein the second image has a higher resolution than the first image. The artificial neural network is trained by inputting a dataset representing the first image and the second image; generating a conversion image of the semiconductor wafer based on the first image, the conversion image having a higher resolution than the first image; and calibrating weights and biases of the artificial neural network to match the conversion image to the second image within a predetermined differential reference value. A third image of the semiconductor wafer is generated based on the calibrated weights and biases of the artificial neural network.

According to an exemplary embodiment, a method of converting an image of a semiconductor wafer to monitor a semiconductor fabrication process includes receiving a first image and a second image of a semiconductor wafer by a processor executing an image conversion model having an artificial neural network. The artificial neural network of the image conversion model is trained by: inputting a dataset representing the first image and the second image; generating a conversion image of the semiconductor wafer based on the first image, the conversion image having a higher resolution than the first image; and calibrating weights and biases of the artificial neural network to match the conversion image to the second image within a predetermined differential reference value. A third image is generated based on the calibrated weights and biases of the artificial neural network.

According to an exemplary embodiment, a system includes at least one processor; and at least one non-transitory computer-readable storage medium storing instructions that, when executed by the at least one processor, cause the system to receive a first image and a second image of a semiconductor wafer, the first image and the second image being generated by a measuring device, wherein the second image has a higher resolution than the first image. An artificial neural network of an image conversion model is trained by: inputting a dataset representing the first image and the second image; generating a conversion image of the semiconductor wafer based on the first image, the conversion image having a higher resolution than the first image; and calibrating weights and biases of the artificial neural network to match the conversion image to the second image within a predetermined differential reference value. A third image of the semiconductor wafer is generated based on the calibrated weights and biases of the artificial neural network.

DETAILED DESCRIPTION OF THE EXEMPLARY EMBODIMENTS

Below, exemplary embodiments of the inventive concept will be described in detail and clearly to such an extent that one of ordinary skill in the art may easily implement the inventive concept.

Figure 1:
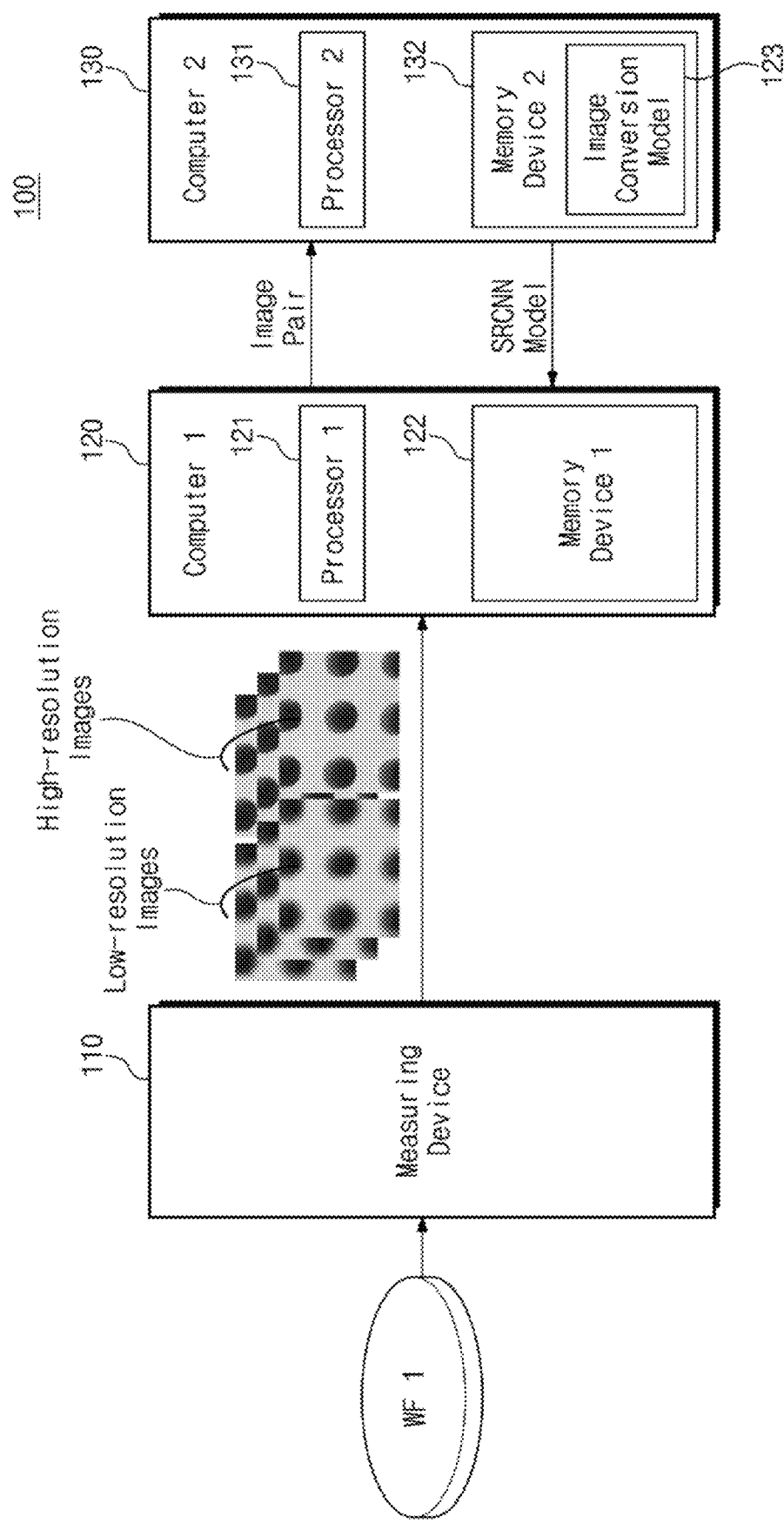
FIG. 1 is a diagram illustrating a system for monitoring a semiconductor fabrication process according to an exemplary embodiment of the inventive concept.

FIG. 1 is a diagram illustrating a system for monitoring a semiconductor fabrication process according to an exemplary embodiment of the inventive concept. A system 100 may include a measuring device 110, a first computer 120 and a second computer 130. The system 100 may be configured to monitor a fabrication process of various semiconductor devices. For example, the fabrication process may include a process in which any semiconductor device is fabricated on a semiconductor wafer, a process in which a semiconductor device implemented on the semiconductor wafer is packaged or tested, etc.

A semiconductor device which is monitored by the system 100 may include, for example, a memory device, such as a dynamic random access memory (DRAM) device, a static random access memory (SRAM) device, a thyristor random access memory (TRAM) device, a NAND flash memory device, a NOR flash memory device, a resistive random access memory (RRAM) device, a ferroelectric random access memory (FRAM) device, a phase change random access memory (PRAM) device, a magnetic random access memory (MRAM) device, a dual in-line memory module (DIMM), a solid state drive (SSD) or a memory card. The semiconductor device which is monitored by the system may also include a processing device, such as a central processing unit (CPU), an image signal processing unit (ISP), a digital signal processing unit (DSP), a graphics processing unit (GPU), a vision processing unit (VPU) or a neural processing unit (NPU). The semiconductor device which is monitored by the system may also include a system on chip (SoC), an application specific integrated circuit (ASIC), a field-programmable gate array (FPGA), etc. In the exemplary embodiment described below, the semiconductor device is a semiconductor wafer, but the inventive concept is not limited thereto.

The system may include a measuring device 110. The measuring device 110 may be an electron microscope which is used to monitor a fabrication process for semiconductor wafers including a first semiconductor wafer WF1. For example, the electron microscope may be critical dimension scanning electron microscopy (CI)-SEM) equipment, a critical dimension scanning electron microscope (CD-SEM), a cross-sectional SEM or a transmission electron microscope (TEM).

The measuring device 110 may be configured to measure or monitor a first semiconductor wafer WF1. The measuring device 110 may be configured to generate an image of the first semiconductor wafer WF1. The image of the first semiconductor wafer WF1 generated by the measuring device 110 may be used to measure a structure of the first semiconductor wafer WF1 or to determine a defect of the first semiconductor wafer WF1. For example, referring to FIG. 1, relatively dark portions of the images may indicate holes that are penetrating the first semiconductor wafer WF1. However, the images shown in FIG. 1 are only exemplary.

In one exemplary embodiment, the measuring device 110 may include an electron gun which emits or radiates an electron beam to the first semiconductor wafer WF1. The measuring device 110 may also include a detector which detects electrons generated from the first semiconductor wafer WF1. The measuring device 110 may also include a processor which processes the detected electrons and generates an image of the first semiconductor wafer WF1. The processor may also be configured to control the electron gun and the detector. The measuring device 110 may also include a memory device which is configured to store images, including the image of the first semiconductor wafer WF1.

In an embodiment, the measuring device 110 may be configured to photograph the same point or location of the first semiconductor wafer WF1 and may generate an image pair that includes a low-resolution image (e.g., 512×512) and at least one high-resolution image (e.g., 1024×1024). The numerical values of pixels of the above low-resolution and high-resolution images are only exemplary. Furthermore, while the exemplary embodiment describes a single low-resolution and high-resolution image for the image pair, in other embodiments, the measuring device 110 may generate a plurality of low-resolution images and high-resolution images for the image pair. The measuring device 110 may be configured to transmit or provide the image pair to a first computer 120.

In one exemplary embodiment, the low-resolution image and the high-resolution image may be captured at the same location of the first semiconductor wafer WF1. The high-resolution image and the low-resolution image may be also referred to as a "high-quality image" and a "low-quality image", respectively. The amount of information of the first semiconductor wafer WF1 included in the high-resolution image may be greater than the amount of information of the first semiconductor wafer WF1 included in the low-resolution image. As a critical dimension (CD) of the first semiconductor wafer WF1 decreases, it may be more accurate to measure or test the first semiconductor wafer WF1 using the high-resolution image rather than the low-resolution image.

The first computer 120 may receive the image pair from the measuring device 110 and may transmit or provide the image pair to a second computer 130 without modification. Alternatively, the first computer 120 may process the received image pair and may transmit or provide the processed image pair to the second computer 130.

The first computer 120 may include a first processor 121 and a first memory device 122. The first processor 121 may be any one of the processing devices described above. The first memory device 122 may be any one of the memory devices described above. In other exemplary embodiments, the first computer 120 may include one or more first processors 121 and one or more first memory devices 122. The first computer 120 may include homogeneous or heterogeneous processors and homogeneous or heterogeneous memory devices. The first processor 121 may process the image pair and may store the processed image pair to the first memory device 122.

In another exemplary embodiment, the system 100 may include a plurality of measuring devices 110. The first computer 120 may be a server which may control or manage the plurality of measuring devices 110 and may receive image pairs from the respective measuring devices 110. In other exemplary embodiments, the system 100 may include a plurality of first computers 120 communicating with the plurality of measuring devices 110.

The second computer 130 may be configured to receive the image pair from the first computer 120. The second computer 130 includes "an image conversion model" 123 or an "image converter" which includes an artificial neural network. The image conversion model 123 includes instructions for training the artificial neural network. The image conversion model 123 having a trained artificial neural network may convert a low resolution image to a high resolution image. The image conversion model 123 may be configured to train the artificial neural network by inputting a dataset representing the first and second images of the image pair and calibrating weights and biases of the artificial neural network. In one exemplary embodiment, after the artificial neural network of the image conversion model 123 is trained, the second computer 130 may be configured to transmit or provide the image conversion model 123 which includes the trained artificial neural network to the first computer 120.

The artificial neural network of the image conversion model 123 may include a plurality of neurons. In one exemplary embodiment, the artificial neural network may be a convolutional neural network (CNN) or a super resolution convolutional neural network (SRCNN).

The second computer 130 may be configured to execute the image conversion model 123 which includes the artificial neural network and may convert a low-resolution image to a high-resolution image. In one exemplary embodiment, the second computer 130 may be a deep learning server which is specialized to execute the image conversion model 123. In the exemplary embodiment shown in FIG. 1, the system 100 includes one second computer 130. However, in other exemplary embodiments, the system may include a plurality of second computers 130. In other exemplary embodiments, the first 120 and second 130 computers may be performed by a single computer having one or more processors or GPUs.

In one exemplary embodiment, the second computer 130 may include a second processor 131 and a second memory device 132. The second processor 131 may be any one of the processing devices described above. The second memory device 132 may be any one of the memory devices described above. In certain exemplary embodiments, the second computer 130 may include one or more second processors 131 and one or more second memory devices 132. The second computer 130 may include homogeneous or heterogeneous processors and homogeneous or heterogeneous memory devices.

The image conversion model 123 may be executed by the at least one second processor 131. The weights and biases of the artificial neural network of the image conversion model 123 are stored in the at least one second memory device. The second memory device 132 may be a storage medium which stores information about the artificial neural network. The artificial neural network may be implemented by software or hardware, such as logic circuits, or a combination of hardware and software.

Figure 2:
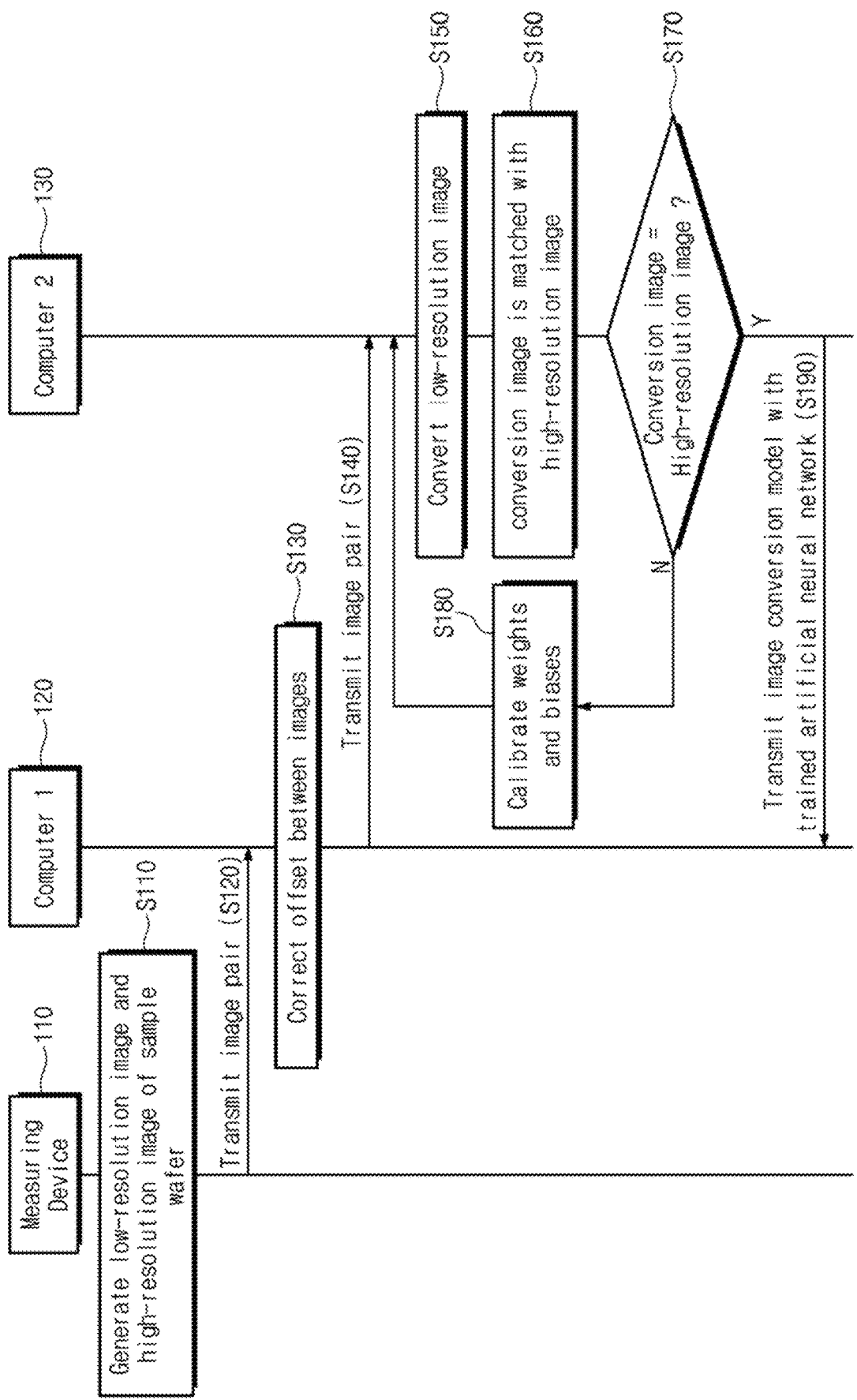
FIG. 2 is a diagram illustrating a process in which the artificial neural network of the image conversion model is trained based on an image pair of FIG. 1 according to an exemplary embodiment of the inventive concept.

Costs and a time necessary to generate a high-resolution image may be greater than costs and a time necessary to generate a low-resolution image. Accordingly, in an exemplary embodiment of the inventive concept, a low-resolution image may be converted to a high-resolution image by the image conversion model 123. For example, in one exemplary embodiment, the first semiconductor wafer WF1 may be a sample semiconductor wafer and the image pair of the first semiconductor wafer WF1 may be a sample image pair. As shown in FIGS. 1-2, the system 100 includes the image conversion model 123 which is configured to train the artificial neural network by calibrating the weights and biases based on a comparison of the images of the sample image pair. After the artificial neural network of the image conversion model 123 is trained, the image conversion model 123 may convert a low-resolution image of any other semiconductor wafer to a high-resolution image. Accordingly, the image conversion model 123 may obviate the need for the measuring device 110 to generate a high-resolution image associated with the other semiconductor wafers. Therefore, both the time and costs required to obtain a high-resolution image of a semiconductor wafer may be improved by the image conversion model 123. The processes in which the artificial neural network of the image conversion model 123 is trained and the use of the trained artificial neural network of the image conversion model 123 will be described with reference to FIGS. 2 to 8.

FIG. 2 is a diagram illustrating a process in which the artificial neural network of the image conversion model is trained based on the dataset from the image pair of FIG. 1. FIG. 2 will be described with reference to FIG. 1.

In operation S110, the measuring device 110 may monitor or measure the first semiconductor wafer WF1 and may generate at least one low-resolution image and at least one high-resolution image of the first semiconductor wafer WF1. In an exemplary embodiment, the first semiconductor wafer WF1 may be any one of a plurality of semiconductor wafers manufactured through a semiconductor fabrication process that is selected as a sample semiconductor wafer. Since it is necessary to increase the number of measurement frames or a resolution of the measuring device 110 for measuring the high-resolution image, a time necessary for the measuring device 110 to scan the first semiconductor wafer WF1 or the number of times to scan the first semiconductor wafer WF1 may increase. Accordingly, a time necessary for the measuring device 110 to generate the high-resolution image may be longer than a time necessary for the measuring device 110 to generate the low-resolution image.

In one exemplary embodiment, the measuring device 110 may generate a second image pair of a low-resolution image and a high-resolution image indicating a second location of the first semiconductor wafer WF1. The second image pair is in addition to a first image pair of a low-resolution image and a high-resolution image indicating a first location of the first semiconductor wafer WF1. As the number of image pairs respectively indicating a plurality of locations of the first semiconductor wafer WF1 is increased by the measuring device 110, the calibration (or accuracy) of the weights and biases of the artificial neural network of the image conversion model 123 by the second computer 130 may be improved. Also, as various shapes or features of the first semiconductor wafer WF1 are included in the image pairs, the accuracy of the calibration of the weights and biases of the artificial neural network of the image conversion model

123 may be improved. The measuring device 110 may be configured to generate a plurality of image pairs indicating a plurality of locations of the first semiconductor wafer WF1.

In operation S120, the measuring device 110 may transmit at least one image pair to the first computer 120. The measuring device 110 and the first computer 120 may communicate with each other through a physical or logical network such as an Internet, an intranet, a local area network (LAN), a wide area network (WAN), etc. Each of the measuring device 110 and the first computer 120 may support wired communication or wireless communication.

In operation S130, the first computer 120 may receive the at least one image pair. For example, an offset may exist between the low-resolution image and the high-resolution image generated in operation S110. The first processor 121 of the first computer 120 may be configured to correct or calibrate the offset between the low-resolution image and the high-resolution image. For example, in one exemplary embodiment, to correct the offset, the first processor 121 may perform Fourier transform on the low-resolution image and the high-resolution image to adjust a phase difference, and thus, locations of the images may be adjusted. For another example, to correct the offset, the first processor 121 may allow the low-resolution image and the high-resolution image to overlap each other and may adjust locations of the images so that an overlapping result is maximally clear.

In operation S140, the first computer 120 may be configured to transmit the offset-corrected image pair to the second computer 130. The first computer 120 and the second computer 130 may communicate with each other through the above-described physical or logical network. The second computer 130 may support wired communication or wireless communication. However, in alternative embodiments, the first computer 120 may receive an image pair and may not correct an offset between a low-resolution image and a high-resolution image. In this embodiment, the first computer 120 may transmit the received image pair to the second computer 130 without modification.

In operations S150-S180, the second processor 131 of the second computer 130 executing the image conversion model 123 may train the artificial neural network by inputting the dataset represented by the image pair into the artificial neural network and calibrating the weights and biases of the artificial neural network. The weights and biases of the artificial neural network are calibrated until a conversion image generated by the image conversion model 123 based on the low-resolution image is sufficiently similar to the high-resolution image. A resolution of the conversion image converted by the image conversion model 123 may be higher than a resolution of the low-resolution image. A time necessary for the conversion of a low-resolution image by the image conversion model 123 executed by the second processor 131 may be very shorter than a time necessary for the generation of a high-resolution image by the measuring device 110.

In Operation S150, the image conversion model 123 generates a conversion image based on the low-resolution image. Operation S150 will be more fully described with reference to FIGS. 3 and 4. In operation S160, the second processor 131 may compare the conversion image of operation S150 with the high-resolution image of operation S110. Since the high-resolution image of operation S110 is compared with the conversion image, the high-resolution image may be referred to as a "reference image". For example, in one exemplary embodiment, the second processor 131 may be configured to calculate a mean square error (MSE) as a loss function "L" for a difference between the conversion image and the high-resolution image. The loss function "L" may be expressed by Equation 1.

$$L(W, B) = \frac{1}{n}\sum_{1}^{n} |C(W, B) - H|^2 \quad \text{[Equation 1]}$$

"W" may indicate weights of an artificial neural network, "B" may indicate biases of the artificial neural network, "C" may indicate an output of the artificial neural network (e.g., the conversion image), and "H" may indicate the high-resolution image generated in operation S110. "n" may indicate the number of sample images input to the artificial neural network for training, such as the number of image pairs generated in operation S110. For example, the loss function "L" may be calculated based on a pixel unit of the conversion image and the high-resolution image.

In operation S170, the second processor 131 may be configured to determine whether the conversion image is matched with or similar to the high-resolution image, based on a result of the comparison. If the conversion image is matched with the high-resolution image or the conversion image is similar to the high-resolution image, this may indicate that the image conversion model 123 is sufficiently accurate. In this case, the second processor 131 may perform operation S190 and transmit the image conversion model 123 with the trained artificial neural network to the first computer 120. However, if the conversion image is not matched with the high-resolution image or the conversion image is not similar to the high-resolution image, this may indicate that calibration of the artificial neural network is required. In this case, the second processor 131 may be configured to perform operation S180 and calibrate the weights and biases of the artificial neural network. For example, the second processor 131 may determine whether a value of the loss function "L" is minimized or compare L to a reference value.

In operation S180, the second processor 131 executing the image conversion model 123 may be configured to calibrate information of the artificial neural network so that the conversion image of operation S150 is matched with the high-resolution image of operation S110. In one exemplary embodiment, the second processor 131 is configured to calibrate the weights and biases of the artificial neural network. In one exemplary embodiment, the second processor 131 may be configured to use the comparison result (e.g., the value of the loss function "L") of operation S160 to correct the weights and the biases. The second processor 131 may be configured to repeat operation S150 to operation S180 until the image conversion model 123 is sufficiently accurate.

The second processor 131 executing the image conversion model 123 may be configured to compare the conversion image with the high-resolution image, calibrate the weights and biases of the artificial neural network of the image conversion model 123 based on a result of the comparison, and again convert the low-resolution image by using the artificial neural network having the calibrated weights and biases. The second processor 131 may be configured to repeatedly perform operation S150 to operation S180 until the conversion image is matched with the high-resolution image or the conversion image becomes similar to the high-resolution image. For example, the second processor 131 may be configured to repeatedly perform operation S150 to operation S180 until the value of the loss function "L" is minimized or is smaller than a reference value. Through operation S150 to operation S180 (e.g., training) repeatedly performed by the second processor 131 executing the image conversion model 123, the artificial neural network of the image conversion model 123 may be trained so that the image conversion model 123 may convert any low-resolution image to a high-resolution image. The image pair generated in operation S110 may be utilized for the training of the artificial neural network of the image conversion model 123 and may be referred to as a "training set".

The second processor 131 may be configured to store or update the weights and biases calibrated through operation S150 to operation S180 in the second memory device 132. Additionally, the second processor 131 may repeatedly store or update the value of the loss function "L" in the second memory device 132.

The second memory device 132 may be a non-transitory computer-readable medium storing or including the image conversion model 123. The weights and biases of the artificial neural network of the image conversion model 123 in the second memory device 132 may be updated and optimized by the second processor 131 until the conversion image generated by the image converter is matched with the high-resolution image or the conversion image becomes similar to the high-resolution image.

In operation S190, the second processor 131 may be configured to transmit, provide, or output the image conversion model 123 which includes the trained artificial neural network to the first computer 120. The image conversion model 123 may be stored in the first memory device 122 of the first computer 120. After the first computer 120 receives the image conversion model 123 having the trained artificial neural network in operation S190, the first processor 121 may be configured to convert a low-resolution image to a high-resolution image (e.g., a conversion image) by using the image conversion model 123.

Figure 3:
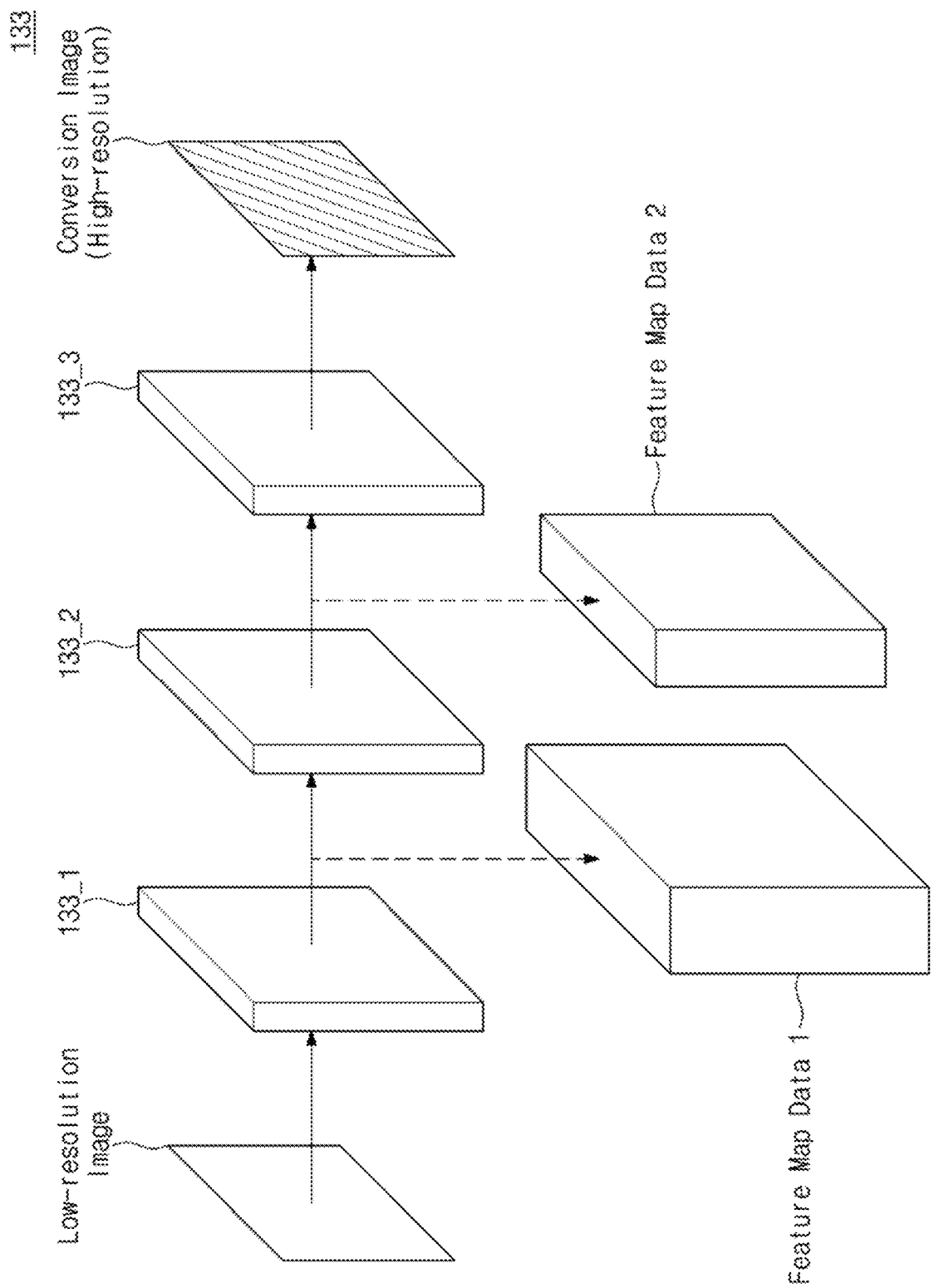
FIG. 3 is a diagram illustrating an artificial neural network of the image conversion model according to an exemplary embodiment of the inventive concept.
Figure 4:
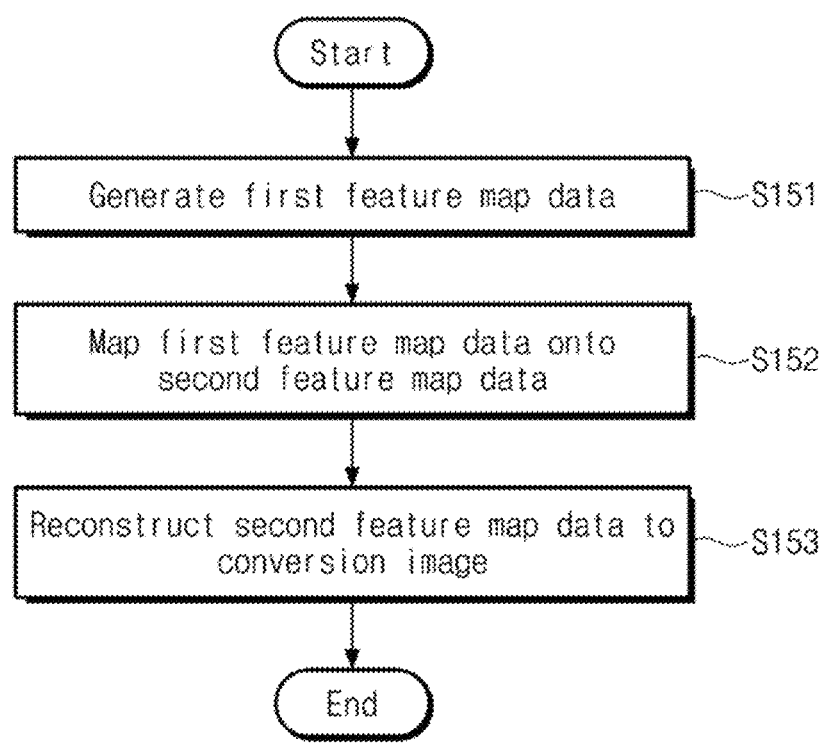
FIG. 4 is a flowchart illustrating sub operations of operation S150 of FIG. 2 according to an exemplary embodiment of the inventive concept.

FIG. 3 is a diagram illustrating an artificial neural network 133 which is executed on a second computer of FIG. 1. FIG. 4 is a flowchart illustrating sub operations of operation S150 of FIG. 2. FIGS. 3 and 4 will be described with reference to FIGS. 1 and 2 together.

An artificial neural network 133 which is executed by the second processor 131 may include a first layer 133_1, a second layer 133_2, and a third layer 133_3. In an exemplary embodiment, the artificial neural network 133 may include at least one or more layers. As the number of layers increases, a depth of the artificial neural network 133 may increase. Each of the first to third layers 133_1 to 133_3 may include a plurality of neurons. A neuron may be configured to receive a result obtained by adding biases to a result of multiplying input signals and weights together and may output a signal to another neuron. The input signals may be provided from any other neurons or may be provided from the low-resolution image of operation S110.

In operation S151, the second processor 131 executing the image conversion model may provide the low-resolution image to the first layer 133_1. The second processor 131 executing the image conversion model may generate a first feature map data $F_1(I)$ associated with the low-resolution image based on first weights $W_1$ and first biases $B_1$ of the first layers 133_1. The operation of the first layer 133_1 may be expressed by Equation 2.

$$F_1(I)=\max(0,W_1*I+B_1) \qquad \text{[Equation 2]}$$

"I" may indicate an input image, such as a low-resolution image. "*" may indicate a convolution operation. The second processor 131 may be configured to perform the operation of the first layer 133_1 and may extract a patch of the low-resolution image.

The convolution operation of Equation 2 may be repeatedly performed while at least one filter smaller in size than the low-resolution image is sequentially shifted on the low-resolution image. In one exemplary embodiment, the filter shift may accompany the following operations: 1) data of the low-resolution image corresponding to a location of the filter and the first weights $W_1$ may be multiplied together, 2) all multiplication results may be added, and 3) the first biases $B_1$ may be added to the addition results. The second processor 131 may be configured to perform a convolution operation associated with the first weights $W_1$ and an addition operation associated with the first biases $B_1$. The first layer 133_1 may be referred to as a "convolution layer".

The second processor 131 executing the image conversion model may generate the first feature map data $F_1(I)$ by applying an activation function to a result of the above-described operations. As shown in the exemplary embodiment of Equation 2, a rectified linear unit (ReLU) function may be applied. However, the second processor 131 may be configured to use any other activation function such as a Leaky ReLU function, a sigmoid function, a Tan H function, or an ArcTan function.

In operation S152, the first feature map data $F_1(I)$ may be provided to the second layer 133_2 under control of the second processor 131. The second processor 131 may be configured to nonlinearly map the first feature map data $F_1(I)$ onto second feature map data $F_2(I)$ based on second weights $W_2$ and second biases $B_2$ of the second layer 133_2. The operation of the second layer 133_2 may be expressed by Equation 3.

$$F_2(I)=\max(0,W_2*F_1(I)+B_2) \qquad \text{[Equation 3]}$$

Equation 3 may be similar to Equation 2 except that the first feature map data $F_1(I)$, the second weights $W_2$, and the second biases $B_2$ are used instead of the low-resolution image "I", the first weights $W_1$, and the first biases $B_1$. The second processor 131 may be configured to perform an operation of the second layer 1332 and may generate the second feature map data $F_2(I)$. The second processor 131 may be configured to perform a convolution operation associated with the second weights $W_2$ and an addition operation associated with the second biases $B_2$. The second layer 133_2 may be referred to as a "convolution layer".

In operation S153, the second processor 131 executing the image conversion model may be configured to provide the second feature map data $F_2(I)$ to the third layer 133_3. The second processor 131 may be configured to reconstruct the second feature map data $F_2(I)$ to a conversion image based on third weights $W_3$ and third biases $B_3$ of the third layer 133_3. The operation of the third layer 133_3 may be expressed by Equation 4.

$$F_3(I)=W_3-F_2(I)+B_3 \qquad \text{[Equation 4]}$$

Equation 4 may be similar to Equation 3 except that the second feature map data $F_2(I)$, the third weights $W_3$ and the third biases $B_3$ are used instead of the first feature map data $F_1(I)$, the second weights $W_2$ and the second biases $B_2$. The second processor 131 may be configured to perform a convolution operation associated with the third weights $W_3$ and an addition operation associated with the third biases $B_3$. The third layer 133_3 may be referred to as a "convolution layer".

The third layer 133_3 may correspond to the last layer of layers in the artificial neural network 133. For example, in one exemplary embodiment, the filter shift may accompany the following operations: 1) a portion of the second feature map data $F_2(I)$ corresponding to a location of the filter and the third weights $W_3$ may be multiplied together, 2) all multiplication results may be added, and 3) the third biases $B_3$ may be added to the addition results. However, the second processor 131 may be configured to refrain from applying an activation function to a result of the above-described operations. The second processor 131 may perform the operation of the third layer 133_3 and may generate the conversion image.

As described above, the second processor 131 executing the image conversion model may be configured to calibrate the weights and biases of the artificial neural network so that the conversion image generated through operation S151 to operation S153 is matched with the high-resolution image (operation S180). The second processor 131 may be configured to compare the conversion image with the high-resolution image and may calibrate the first to third weights $W_1$ to $W_3$ and the first to third biases $B_1$ to $B_3$ based on a result of the comparison. The second processor 131 executing the image conversion model may be configured to repeatedly perform calibration of the weights and biases of operations S151, S152, S153, S160, S170 and S180. The second processor 131 may then perform operation S151 to operation S153 based on the calibrated first to third weights $W_1$ to $W_3$ and the calibrated first to third biases $B_1$ to $B_3$.

Figure 5:
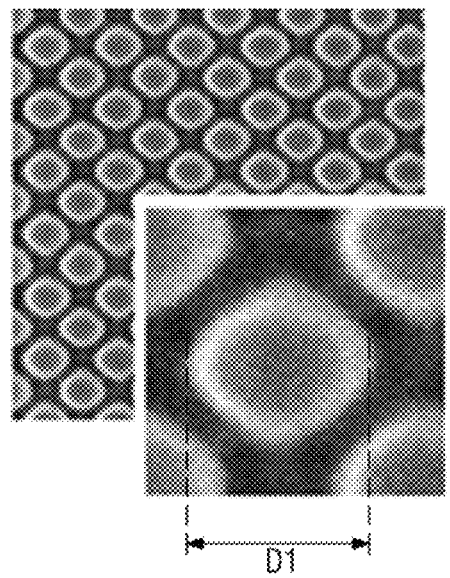
FIGS. 5 to 7 are diagrams illustrating a low-resolution image, a high-resolution image and a conversion image of a semiconductor wafer according to an exemplary embodiment of the inventive concept.
Figure 6:
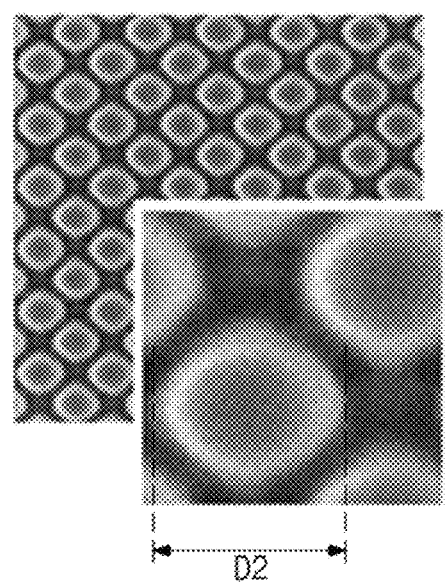
Figure 7:
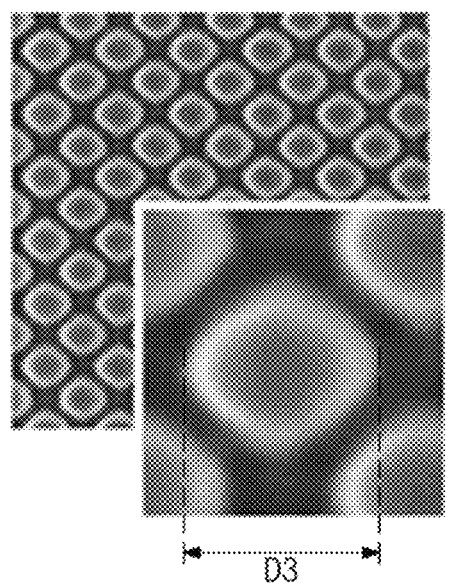
Figure 8:
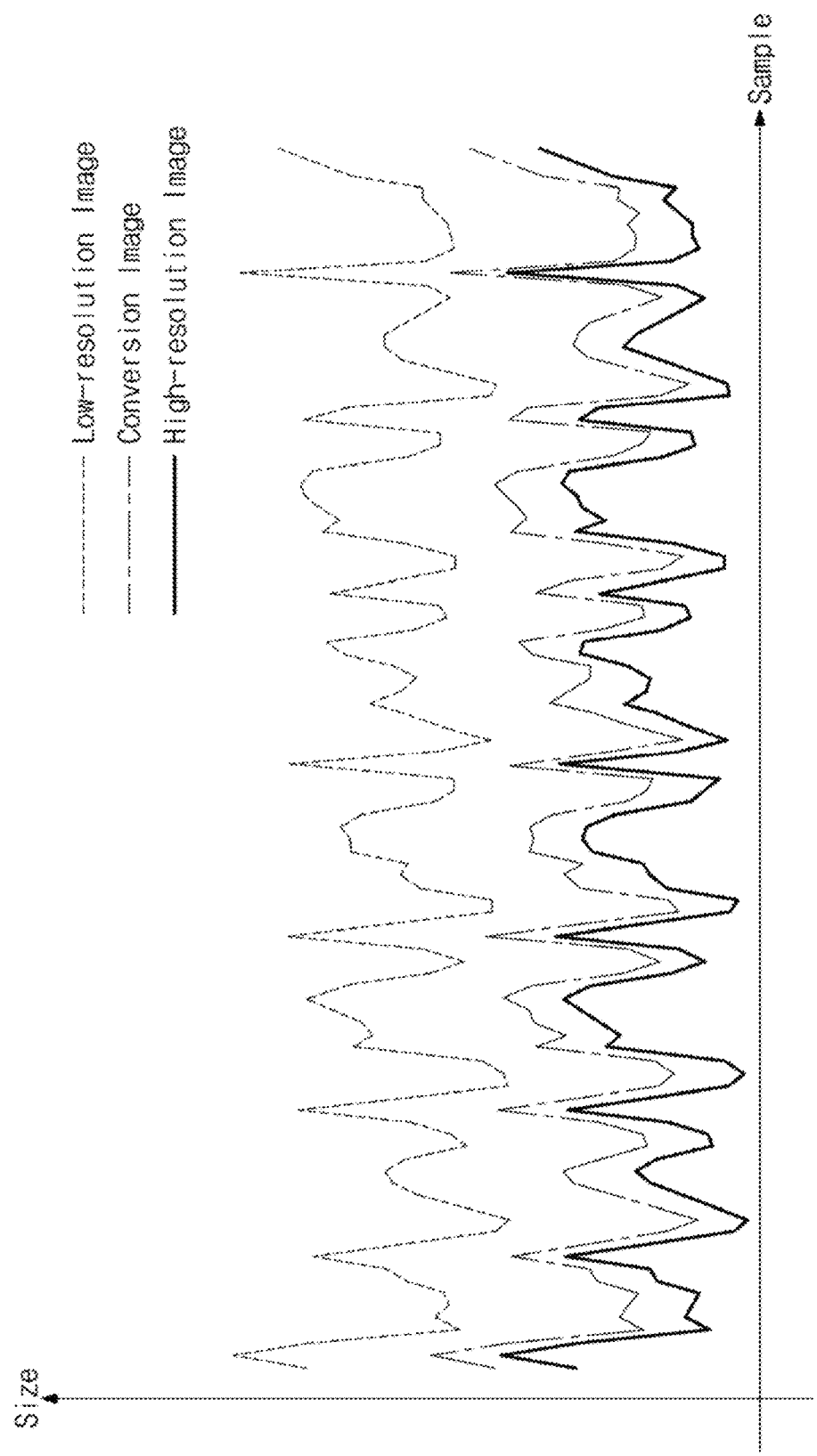
FIG. 8 is a graph showing a comparison between a low-resolution image, a high-resolution image and a conversion image of FIGS. 5 to 7 according to an exemplary embodiment of the inventive concept.

FIGS. 5 to 7 are diagrams illustrating a low-resolution image, a high-resolution image and a conversion image of a semiconductor wafer according to an embodiment of the inventive concept. FIG. 8 is a diagram illustrating a graph for comparison between a low-resolution image, a high-resolution image and a conversion image of FIGS. 5 to 7. FIGS. 5 to 8 will be described together with reference to FIGS. 1 and 2.

In one exemplary embodiment, an image of FIG. 5 may be a low-resolution image of the first semiconductor wafer WF1 generated by the measuring device 110 as described in operation S110. In one exemplary embodiment, an image of FIG. 6 may be a high-resolution image of the first semiconductor wafer WF1 generated by the measuring device 110 as described in operation S110. An image of FIG. 7 may be a conversion image generated by the image conversion model with a trained artificial neural network as described in operation S150 to operation S180, which may be repeatedly performed. The conversion image of FIG. 7 may have a higher resolution than the low-resolution image of FIG. 5. The conversion image of FIG. 7 and the high-resolution image of FIG. 6 may be matched with each other or may be similar to each other.

In FIG. 8, a horizontal axis may represent a plurality of samples repeatedly arranged on the first semiconductor wafer WF1. A sample may be referred to as a "semiconductor die", a "semiconductor chip", a "semiconductor device", etc. In FIG. 8, a vertical axis may represent the sizes D1, D2, and D3 or diameters of structures (e.g., pillars) on the images of FIGS. 5 to 8. Referring to FIG. 8, first differences or errors between the sizes D3 of conversion images, which are generated by converting low-resolution images corresponding to the plurality of samples by the image conversion model and the sizes D2 of high-resolution images may be smaller than second differences or errors between the low-resolution images D1 corresponding to the plurality of samples and the sizes D2 of the high-resolution images. An average of the second differences may decrease as much as 70% or more by the image conversion model executed by the second processor 131. For example, in one exemplary embodiment, an average of the first errors may be less than 30% of the average of the second differences.

After the artificial neural network of the image conversion model is completely trained through operation S110 to operation S180, the measuring device 110 may generate only a low-resolution image of a semiconductor wafer and the low-resolution image may be converted to a conversion image having a high resolution by the image conversion model. Accordingly, in one exemplary embodiment, the monitoring of the manufacture of a semiconductor device may be performed by the measuring device 110 without generating a high-resolution image of the semiconductor wafer. Since the measuring device 110 does not need to generate a high-resolution image of a semiconductor wafer, the costs and time necessary for the measuring device 110 to test the semiconductor wafer may decrease. Additionally, the capacity of the measuring device 110 may be improved.

Figure 9:
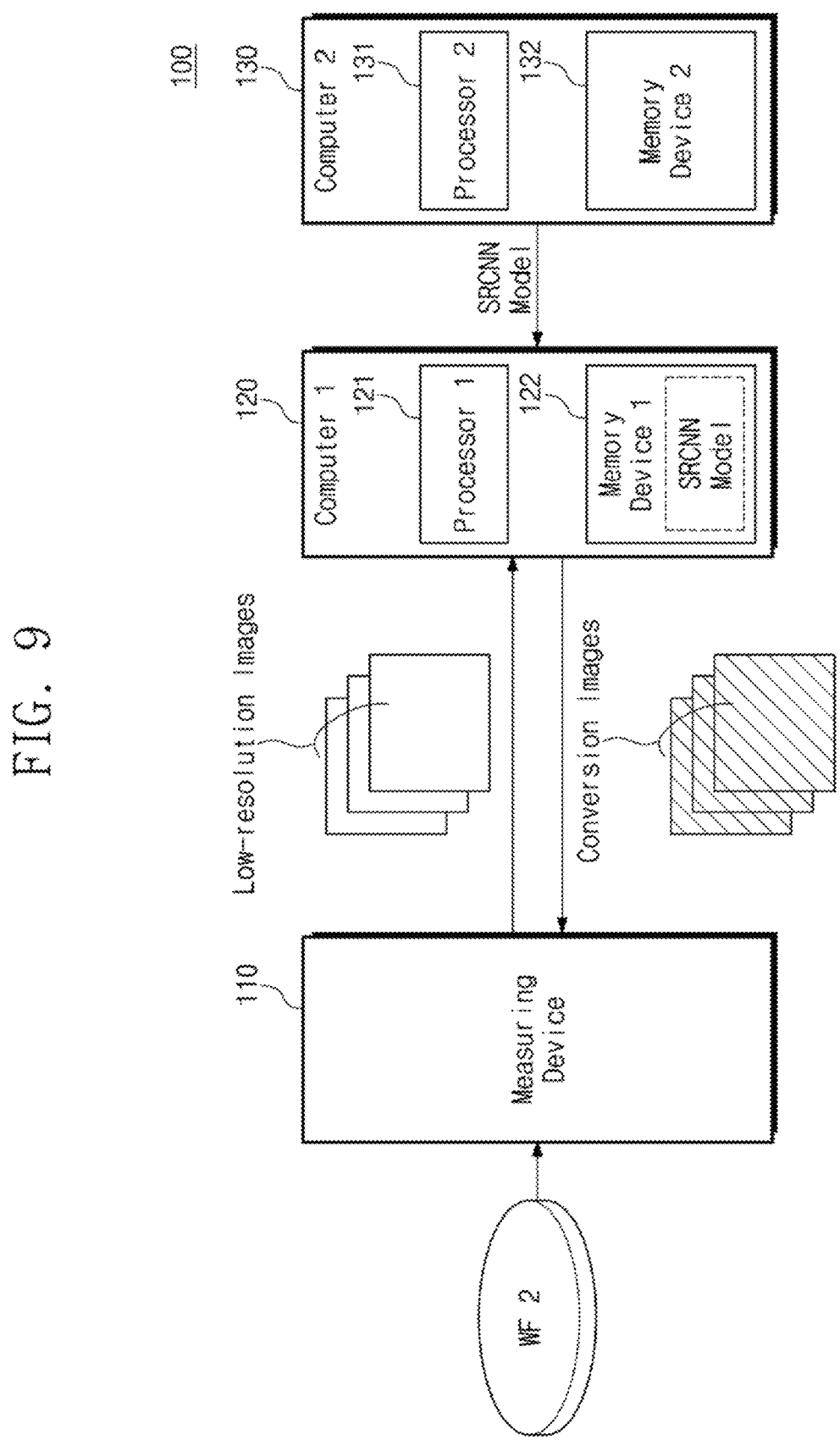
FIG. 9 is a diagram illustrating a process in which a system of FIG. 1 monitors a semiconductor wafer according to an exemplary embodiment of the inventive concept.

FIG. 9 is a diagram illustrating a process in which a system of FIG. 1 monitors a semiconductor wafer. FIG. 9 will be described with reference to FIGS. 1 and 2.

In one exemplary embodiment, after training of the artificial neural network is completed by the second processor 131 of the second computer 130 according to operation S190 of FIG. 2, the second computer 130 may be configured to transmit the image conversion model (e.g., the SRCNN model) stored in the second memory device 132 to the first computer 120. The first processor 121 may store the image conversion model in the first memory device 122. The measuring device 110 may be configured to generate low-resolution images of a second semiconductor wafer WF2. The second semiconductor wafer WF2 may be a semiconductor wafer which is manufactured identically to the first semiconductor wafer WF1 but is not selected as a sample semiconductor wafer for the training of the artificial neural network of the image conversion model. In the exemplary embodiment shown in FIG. 9, one second semiconductor wafer WF2 is provided to the measuring device 110. However, the number of semiconductor wafers to be provided to the measuring device 110 is not limited to the example illustrated in FIG. 9.

The first processor 121 may be configured to convert the low-resolution images of the second semiconductor wafer WF2 and generate conversion images by using the image conversion model having the trained artificial neural network. The first processor 121 may execute the image conversion model without modification, the training of which is completed by the second processor 131. The conversion image may be generated by the image conversion model executed by the first processor 121 instead of generating a high-resolution image of the second semiconductor wafer WF2 at the measuring device 110. Accordingly, the time necessary to test or determine the second semiconductor wafer WF2 may be decreased.

As illustrated in FIG. 9, the first processor 121 may be configured to provide the conversion image to the measuring device 110. However, in alternative exemplary embodiments, the first processor 121 may be configured to provide the conversion image to any other device and a user may check the conversion image through the other device. The above-described storage device may be configured to store the conversion image and may display the conversion image. In some exemplary embodiments, the measuring device 110 may also be configured to display the conversion image to enable the user to view the conversion image on the measuring device.

Figure 10:
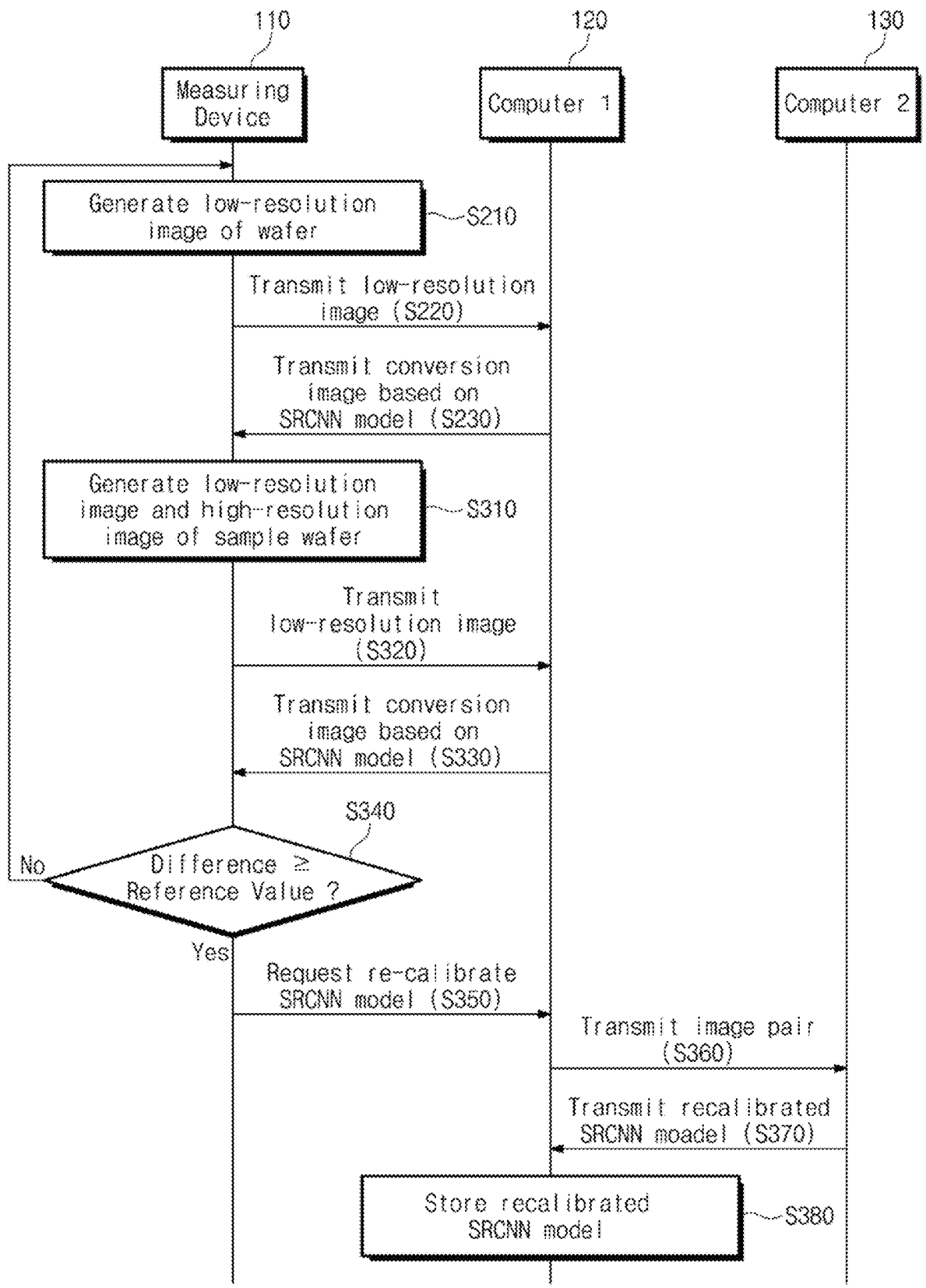
FIG. 10 is a diagram illustrating a process in which a system of FIG. 9 monitors a semiconductor wafer according to an exemplary embodiment of the inventive concept.

FIG. 10 is a diagram illustrating a process in which a system of FIG. 9 monitors a semiconductor wafer. FIG. 10 will be described together with reference to FIGS. 2 and 9.

In operation S210, the measuring device 110 may be configured to generate a low-resolution image of a second semiconductor wafer. In operation S210, the measuring device 110 may be configured to refrain from generating a high-resolution image of the second semiconductor wafer. In operation S220, the measuring device 110 may be configured to transmit the low-resolution image to the first computer 120. For example, operation S220 may be performed only after the image conversion model having the trained artificial neural network is transferred to the first computer 120 in operation S190.

In operation S230, the first processor 121 of the first computer 120 may be configured to convert the transmitted low-resolution image by using the image conversion model. The first memory device 122 may be a non-transitory computer-readable medium storing or including the image conversion model.

The artificial neural network of the image conversion model executed by the first computer 120 may be trained by the second processor 131 based on the sample images of operation S110 as shown in FIG. 2. The image conversion model which includes the trained artificial neural network may be continuously used to convert a low-resolution image to a conversion image having a high resolution. The first computer 120 may transmit the conversion image to the measuring device 110. As described above, the measuring device 110 may be configured to refrain from generating a high-resolution image after operation S190 of FIG. 2. The high-resolution image may be generated by the first processor executing the image conversion model instead of the measuring device 110. The first computer 120 may be configured to repeatedly perform operation S210 to operation S230 as semiconductor wafers are provided to the measuring device 110.

In operation S310, the measuring device 110 may monitor a sample semiconductor wafer and may generate a low-resolution image and a high-resolution image of the sample semiconductor wafer. The sample semiconductor wafer of operation S310 may be any one of a plurality of semiconductor wafers manufactured through the semiconductor fabrication process. In one exemplary embodiment, the sample semiconductor wafer of operation S310 may be different from the first semiconductor wafer WF1 of operation S110.

The measuring device 110 may be configured to perform operation S310 periodically or randomly to check and maintain the accuracy and consistency of the image conversion model. For example, the measuring device 110 may perform operation S310 at specific temporal periods. In another exemplary embodiment, the measuring device 110 may perform operation S310 in response to a request of the user. In one exemplary embodiment, operation S310 may be similar to operation S10. In another exemplary embodiment, the measuring device 110 may be configured to perform operation S310 when the measuring device measures a new color, a new structure, or a new pattern of a semiconductor wafer or the type of semiconductor wafer is changed.

In operation S320, the measuring device 110 may be configured to transmit only the low-resolution image to the first computer 120. In operation S330, the first computer 120 may be configured to convert the transmitted low-resolution image by using the image conversion model which includes the trained artificial neural network. The first computer 120 may be configured to transmit the conversion image having the higher resolution than the low-resolution image to the measuring device 110. In one exemplary embodiment, operation S320 and operation S330 are similar to operation S220 and operation S230.

In operation S340, the measuring device 110 may be configured to compare the high-resolution image generated in operation S310 with the conversion image provided by operation S330. Based on a result of the comparison, the measuring device 110 may determine whether to signal to the first processor executing the image conversion model to again calibrate the weights and biases of the artificial neural network through the performance of operation S110 to operation S190 of FIG. 2. For example, the measuring device 110 may calculate the MSE as the loss function "L" for a difference between the conversion image and the high-resolution image.

The measuring device 110 may be configured to repeatedly perform operation S210 to operation S230 when the difference between the conversion image and the high-resolution image (e.g., a value of the loss function "L") is smaller than or equal to a reference value. In other exemplary embodiments, the measuring device 110 may perform operation S350 when the difference between the conversion image and the high-resolution image is greater than or equal to the reference value.

In operation S350, the measuring device 110 may request the image conversion model on the first computer 120 to calibrate the weights and biases of the artificial neural network of the image conversion model. The measuring device 110 may transmit an image pair of the low-resolution image and the high-resolution image measured in operation S310 to the first computer 120 (this may be similar to operation S120). Here, the image pair may be measured in operation S310 or may be newly generated by measuring a new sample semiconductor wafer.

In operation S360, the first processor 121 of the first computer 120 may transmit the image pair to the second computer 130 for recalibrating the weights and biases of the artificial neural network (this may be similar to operation S140). For example, the first processor 121 may correct an offset between the low-resolution image and the high-resolution image (this may be similar to operation S130). In other exemplary embodiments, the measuring device 110 may directly request the second computer 130 to again calibrate the weights and biases of the artificial neural network of the image conversion model and may directly transmit the image pair of the low-resolution image and the high-resolution image measured in operation S310 to the second computer 130.

The second processor 131 executing the image conversion model may be configured to receive the image pair for re-calibration and may re-calibrate or tune the weights and biases of the artificial neural network of the image conversion model by using the image pair. The second processor 131 may be configured to repeatedly perform operations S150, S151, S152, S153, S160, S170, and S180 described above to re-calibrate the weights and biases of the artificial neural network of the image conversion model. The second processor 131 may be configured to transmit the image conversion model having the trained artificial neural network to the first computer (this may be similar to operation S190). In operation S380, the first computer 120 may store the re-calibrated image conversion model to the first memory device 122.

Figure 11:
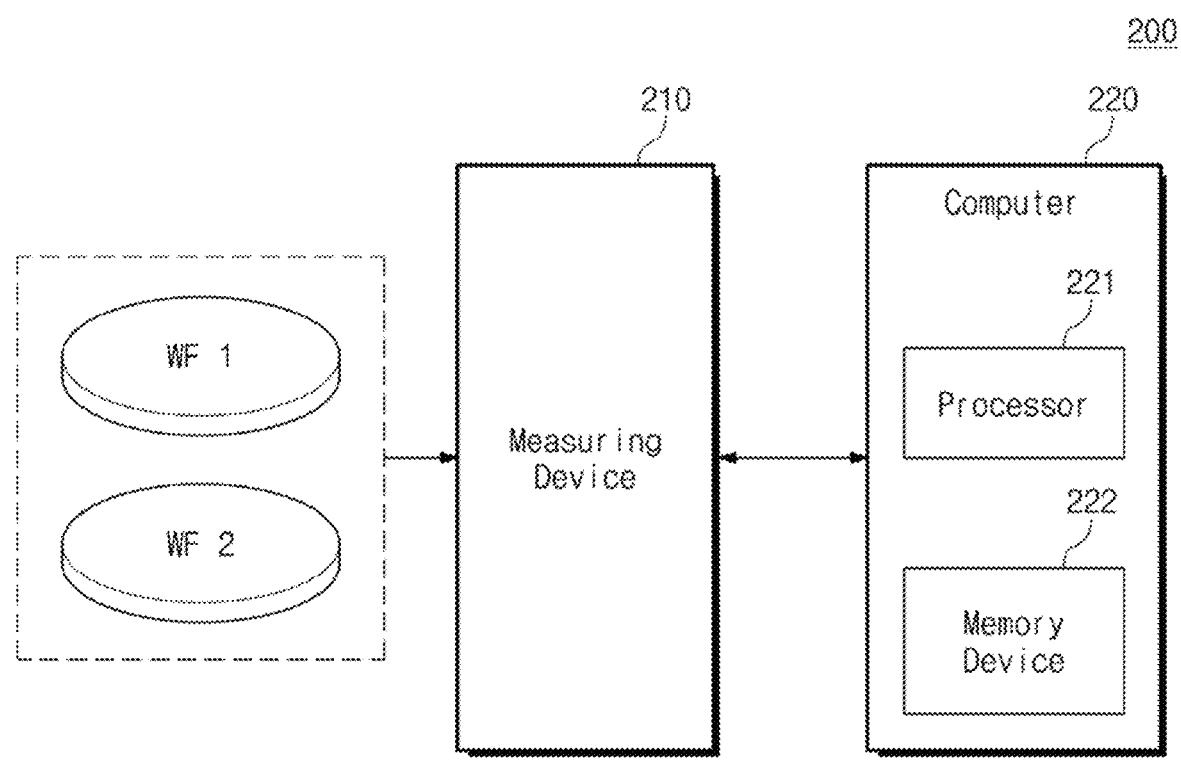
FIG. 11 is a diagram illustrating a system for monitoring a semiconductor fabrication process according to another exemplary embodiment of the inventive concept.

In one exemplary embodiment illustrated in FIG. 11, the operation S340 is performed by the measuring device 110. However, in other exemplary embodiments, operation S340 may be performed by the first processor 121 of the first computer 120 executing the image conversion model. In this embodiment, the measuring device 110 may be configured to transmit both the low-resolution image and the high-resolution image of the sample semiconductor wafer to the first computer 120 after performing operation S310. The first processor 121 may convert the low-resolution image by using the image conversion model. The first processor 121 executing the image conversion model may be configured to compare the conversion image with the high-resolution image. Based on the comparison of the conversion image and the high-resolution image, the measuring device 110 may repeatedly perform operation S210 to operation S230 if the image conversion model is sufficiently accurate. Alternatively, if the image conversion model is not sufficiently accurate, the second processor 131 may be configured to again calibrate the weights and biases of the artificial neural network of the image conversion model.

FIG. 11 is a diagram illustrating a system for monitoring a semiconductor fabrication process according to another embodiment of the inventive concept. A system 200 may include a measuring device 210 and a computer 220. The measuring device 210 may be identical or similar to the measuring device 110 described above. For example, the first semiconductor wafer WF1 may be a sample semiconductor wafer and the second semiconductor wafer WF2 may not be a sample semiconductor wafer. As described above, the measuring device 210 may be provided with a plurality of second semiconductor wafers WF2.

The computer 220 may include a processor 221 and a memory device 222. The computer 220 may be configured to perform all of the above-described operations of the first computer 120 and the second computer 130. The processor 221 may be configured to perform all of the above-described operations of the first processor 121 and the second processor 131 and the processor 221 may be implemented with at least one or more processors. The memory device 222 may perform all the above-described operations of the first memory device 122 and the second memory device 132 and the memory device 222 may be implemented with at least one or more memory devices. In detail, the first computer 120 and the second computer 130 described above may be integrated into the computer 220. For example, the processor 221 of the computer 220 may perform operations S130 to S190, S230, and S330 to S380.

Figure 12:
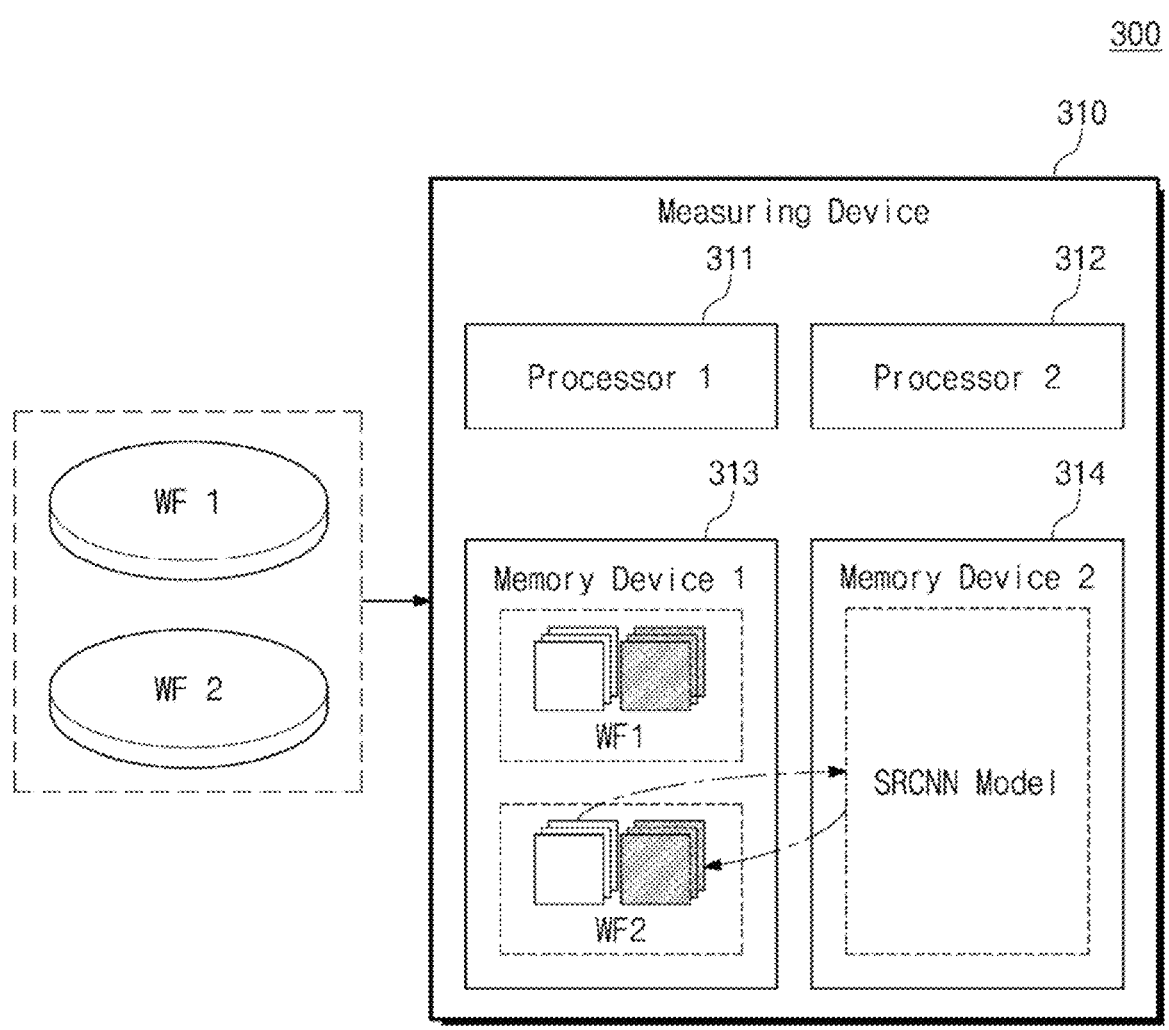
FIG. 12 is a diagram illustrating a system for monitoring a semiconductor fabrication process according to another exemplary embodiment of the inventive concept.

FIG. 12 is a diagram illustrating a system for monitoring a semiconductor fabrication process according to another embodiment of the inventive concept. A system 300 may include a measuring device 310. The measuring device 310 may include the image conversion model and the image conversion model of the measuring device may perform all of the above-described operations of the measuring device 110, the first computer 120, and the second computer 130. In this exemplary embodiment, the measuring device 110, the first computer 120, and the second computer 130 may be integrated into the measuring device 310.

In the exemplary embodiment shown in FIG. 12, the measuring device 310 may include a first processor 311 similar to the first processor 121 described above and a second processor 312 similar to the second processor 131 described above. In other exemplary embodiments, the measuring device 310 may include a processor into which the first processor 311 and the second processor 312 are integrated. The processor may perform operations S110 to S190, S210 to S230, and S310 to S380.

The measuring device 310 may include a first memory device 313 storing images of the first semiconductor wafer WF1 and images of the second semiconductor wafer WF2, and a second memory device 314 storing an image conversion model. High-resolution images (e.g., shaded) of the images of the first semiconductor wafer WF1 may be generated by measuring the first semiconductor wafer WF1. High-resolution images (e.g., shaded) of the images of the second semiconductor wafer WF2 may be generated by the image conversion model. The first memory device 313 and the second memory device 314 may be integrated into one memory device.

According to at least one embodiment of the inventive concept, a measuring device, such as a scanning electron microscope, may quickly generate a low-resolution image instead of a high-resolution image. The low-resolution image generated by the scanning electron microscope may be quickly converted to a high-resolution image by using an image conversion model. Therefore, the scanning electron microscope may monitor the semiconductor fabrication process in an efficient and effective manner even if the size of the materials and components of the process are very small.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A non-transitory computer-readable medium for monitoring a semiconductor fabrication process comprising:
an image conversion model stored on the non-transitory computer-readable medium, the image conversion model having an artificial neural network, wherein the image conversion model includes instructions executable by at least one processor, the instructions when executed by the at least one processor, causes the processor to perform:
receiving a first image and a second image of a semiconductor wafer, the first image and the second image being generated by a measuring device, wherein the second image has a higher resolution than the first image;
training the artificial neural network by:
inputting a dataset representing the first image and the second image;
generating a conversion image of the semiconductor wafer based on the first image, the conversion image having a higher resolution than the first image;
calibrating weights and biases of the artificial neural network to match the conversion image to the second image within a predetermined differential reference value; and
generating a third image of the semiconductor wafer based on the calibrated weights and biases of the artificial neural network.

2. The non-transitory computer-readable medium of claim 1, wherein the first image and the second image are measured at the same location of the semiconductor wafer by the measuring device.

3. The non-transitory computer-readable medium of claim 1, wherein the generation of the conversion image includes:
generating first feature map data associated with the first image, based on first weights of the weights and first biases of the biases;
mapping the first feature map data onto second feature map data, based on second weights of the weights and second biases of the biases; and reconstructing the second feature map data to the conversion image, based on third weights of the weights and third biases of the biases.

4. The non-transitory computer-readable medium of claim 1, wherein the processor executing the image conversion model is configured to compare the conversion image to the second image by using Equation 1 to determine differences between the conversion image and the second image
wherein Equation 1 is:

$$L(W, B) = \frac{1}{n}\sum_{1}^{n} |C(W, B) - H|^2$$

wherein, in Equation 1,
W is weights of the artificial neural network,
B is biases of the artificial neural network,
C is the conversion image,
H is the second image,
n is a number of images received by the processor of the semiconductor wafer, and
L is a loss function.

5. The non-transitory computer-readable medium of claim 3, wherein the generating of the first feature map data includes performing a first convolution operation associated with the first image and the first weights and a first addition operation associated with a first result of the first convolution operation and the first biases,
wherein the mapping of the first feature map data onto the second feature map data includes performing a second convolution operation associated with the first feature map data and the second weights and a second addition operation associated with a second result of the second convolution operation and the second biases, and
wherein the reconstructing of the second feature map data to the conversion image includes performing a third convolution operation associated with the second feature map data and the third weights and a third addition operation associated with a third result of the third convolution operation and the third biases.

6. The non-transitory computer-readable medium of claim 5, wherein:
the first convolution operation is performed by using Equation 2;
the second convolution operation is performed by using Equation 3; and
the third convolution operation is performed by using Equation 4
wherein Equation 2 is:

$$F_1(I) = \max(0, W_1 * I + B_1) \qquad \text{<Equation 2>}$$

wherein, in Equation 2,
$F_1(I)$ is the first feature map data,
$W_1$ is the first weights,
* is a convolution operation,
I is the first image, and
$B_1$ is the first biases
wherein Equation 3 is:

$$F_2(I) = \max(0, W_2 * F_1(I) + B_2) \qquad \text{<Equation 3>}$$

wherein, in Equation 3,
$F_2(I)$ is the second feature map data,
$W_2$ is the second weights,
* is a convolution operation,
$F_1(I)$ is the first feature map data, and
$B_2$ is the second biases wherein Equation 4 is:

$$F_2(I) = W_3 * F_2(I) + B_3 \qquad \text{<Equation 4>}$$

wherein, in Equation 4,
$F_3(I)$ is the third feature map data,
$W_3$ is the third weights,
* is a convolution operation,
$F_2(I)$ is the second feature map data, and
$B_3$ is the third biases.

7. The non-transitory computer-readable medium of claim 1, wherein:
the measuring device is a scanning electron microscope; and
the artificial neural network is a super resolution convolutional neural network (SRCNN) including a first layer based on first weights and first biases, a second layer based on second weights and second biases, and a third layer based on third weights and third biases.

8. The non-transitory computer-readable medium of claim 1, wherein:
the processor executing the image conversion model is configured to send a copy of the image conversion model having the trained artificial neural network to a first device; and
the first device is configured to generate a first high-resolution converted image from a first low-resolution image of a second semiconductor wafer.

9. The non-transitory computer-readable medium of claim 8, wherein a second device is configured to:
receive the first high-resolution converted image from the first device;
compare the first high-resolution converted image with a high-resolution reference image; and
signal to the first device that the artificial neural network of the image conversion model needs re-calibrating if differences between the first high-resolution converted image and the high-resolution reference image is greater than a predetermined re-calibration differential reference value.

10. The non-transitory computer-readable medium of claim 1, wherein the image conversion model is further configured to cause the at least one processor to correct an offset between the first image and the second image.

11. The non-transitory computer-readable medium of claim 8, wherein a time necessary for the first device to generate the first high-resolution converted image is less than a time necessary for the measuring device to generate the second image.

12. The non-transitory computer-readable medium of claim 1, wherein the at least one processor is included in the measuring device.

13. A method of converting an image of a semiconductor wafer to monitor a semiconductor fabrication process, the method comprising:
receiving a first image and a second image of a semiconductor wafer by a processor executing an image conversion model having an artificial neural network;
training the artificial neural network of the image conversion model by:
inputting a dataset representing the first image and the second image;
generating a conversion image of the semiconductor wafer based on the first image, the conversion image having a higher resolution than the first image;

calibrating weights and biases of the artificial neural network to match the conversion image to the second image within a predetermined differential reference value; and generating a third image based on the calibrated weights and biases of the artificial neural network.

14. The method of claim 13, wherein the generation of the conversion image includes:

generating first feature map data associated with the first image, based on first weights of the weights and first biases of the biases;

mapping the first feature map data onto second feature map data, based on second weights of the weights and second biases of the biases; and reconstructing the second feature map data to the conversion image, based on third weights of the weights and third biases of the biases.

15. The method of claim 14, wherein the generating of the first feature map data includes performing a first convolution operation associated with the first image and the first weights and a first addition operation associated with a first result of the first convolution operation and the first biases, wherein the mapping of the first feature map data onto the second feature map data includes performing a second convolution operation associated with the first feature map data and the second weights and a second addition operation associated with a second result of the second convolution operation and the second biases, and wherein the reconstructing of the second feature map data to the conversion image includes performing a third convolution operation associated with the second feature map data and the third weights and a third addition operation associated with a third result of the third convolution operation and the third biases.

16. The method of claim 15, wherein:

the first convolution operation is performed by using Equation 2;

the second convolution operation is performed by using Equation 3; and the third convolution operation is performed by using Equation 4 wherein Equation 2 is:

$$F_1(I) = \max(0, W_1 * I + B_1) \quad \text{<Equation 2>}$$

wherein, in Equation 2,
$F_1(I)$ is the first feature map data,
$W_1$ is the first weights,
* is a convolution operation,
I is the first image, and
$B_1$ is the first biases
wherein Equation 3 is:

$$F_2(I) = \max(0, W_2 * F_1(I) + B_2) \quad \text{<Equation 3>}$$

wherein, in Equation 3,
$F_2(I)$ is the second feature map data,
$W_2$ is the second weights,
* is a convolution operation,
$F_1(I)$ is the first feature map data, and
$B_2$ is the second biases
wherein Equation 4 is:

$$F_3(I) = W_3 * F_2(I) + B_3 \quad \text{<Equation 4>}$$

wherein, in Equation 4,
$F_3(I)$ is the third feature map data,
$W_3$ is the third weights,

* is a convolution operation,
$F_2(I)$ is the second feature map data, and
$B_3$ is the third biases.

17. The method of claim 13, further comprising:

transmitting a copy of the image conversion model having the trained artificial neural network to a first device; and generating a first high-resolution converted image from a dataset of a first low-resolution image of a second semiconductor wafer by the first device.

18. A system comprising:

at least one processor; and at least one non-transitory computer-readable storage medium storing instructions that, when executed by the at least one processor, cause the system to:

receive a first image and a second image of a semiconductor wafer, the first image and the second image being generated by a scanning electron microscope, wherein the second image has a higher resolution than the first image;

train an artificial neural network of an image conversion model by:

inputting a dataset representing the first image and the second image;

generate a conversion image of the semiconductor wafer based on the first image, the conversion image having a higher resolution than the first image;

calibrating weights and biases of the artificial neural network to match the conversion image to the second image within a predetermined differential reference value; and generating a third image of the semiconductor wafer based on the calibrated weights and biases of the artificial neural network.

19. The system of claim 18, wherein the generation of the conversion image includes:

generating first feature map data associated with the first image, based on first weights of the weights and first biases of the biases;

mapping the first feature map data onto second feature map data, based on second weights of the weights and second biases of the biases; and reconstructing the second feature map data to the conversion image, based on third weights of the weights and third biases of the biases.

20. The system of claim 19, wherein the generating of the first feature map data includes performing a first convolution operation associated with the first image and the first weights and a first addition operation associated with a first result of the first convolution operation and the first biases, wherein the mapping of the first feature map data onto the second feature map data includes performing a second convolution operation associated with the first feature map data and the second weights and a second addition operation associated with a second result of the second convolution operation and the second biases, and wherein the reconstructing of the second feature map data to the conversion image includes performing a third convolution operation associated with the second feature map data and the third weights and a third addition operation associated with a third result of the third convolution operation and the third biases.

* * * * *